United States Patent [19]

DelGrande

[11] 4,255,475

[45] * Mar. 10, 1981

[54] MOSAIC STRUCTURES

[76] Inventor: Donald DelGrande, 3526 N. Mascher St., Philadelphia, Pa. 19140

[*] Notice: The portion of the term of this patent subsequent to Oct. 30, 1996, has been disclaimed.

[21] Appl. No.: 22,653

[22] Filed: Mar. 22, 1979

Related U.S. Application Data

[63] Continuation-in-part of Ser. No. 957,028, Nov. 2, 1978, Pat. No. 4,172,547, and a continuation-in-part of Ser. No. 957,029, Nov. 2, 1978.

[51] Int. Cl.$^3$ .................... B23K 1/20; B32B 3/10; B32B 5/16
[52] U.S. Cl. ...................... 428/44; 52/311; 156/63; 156/276; 228/121; 228/122; 228/124; 228/175; 428/45; 428/50; 428/54; 428/57; 428/58; 428/192; 428/323; 428/328; 428/535; 428/537
[58] Field of Search .............. 29/625; 52/311; 156/63, 156/276; 228/121, 122, 124, 175; 428/38, 45, 44, 47–50, 57, 58, 192, 53, 54, 323, 330, 403, 535, 537, 328; 427/127, 205, 328

[56] References Cited

U.S. PATENT DOCUMENTS

| 2,095,402 | 10/1937 | Stark | 428/38 |
| 2,722,496 | 11/1955 | Hosmer | 427/427 X |
| 2,798,577 | 7/1957 | La Forge | 156/276 X |
| 2,848,802 | 8/1958 | Luks | 228/121 |
| 2,991,213 | 7/1961 | Williams | 428/38 |
| 3,283,401 | 11/1966 | Pijls | 156/330 |
| 3,420,728 | 1/1969 | Haverstock | 428/38 |
| 3,438,840 | 4/1969 | George | 428/45 |
| 3,652,372 | 3/1972 | Klazkin | 428/45 |
| 3,676,920 | 7/1972 | Pilditch | 52/747 X |
| 4,033,668 | 7/1977 | Presby | 228/121 X |
| 4,154,880 | 5/1979 | Drennan | 428/38 |
| 4,172,547 | 10/1979 | DelGrande | 156/276 X |

*Primary Examiner*—Bruce H. Hess
*Attorney, Agent, or Firm*—Steele, Gould & Fried

[57] ABSTRACT

A mosaic structure, flat or multi-dimensional, wherein any number of discrete members are soldered together, irrespective of whether such members are of conventionally solderable or conventionally unsolderable materials. The mosaic structures include glass and stained glass structures, such as windows and lampshades, wood mosaics, such as tabletops and other furniture, and hybrid structures, having glass and wood members, as well as members of most other materials. The mosaic structures may be produced by methods taught in copending applications.

10 Claims, 7 Drawing Figures

MOSAIC STRUCTURES

CROSS REFERENCES

This application is a continuation-in-part of my copending application Ser. No. 957,028, filed Nov. 2, 1978, now U.S. Pat. No. 4,172,547, and my copending application Ser. No. 957,029, filed Nov. 2, 1978.

BACKGROUND OF THE INVENTION

1. Field of Invention

This invention relates to mosaic structures, and in particular, to mosaic structures formed from any number of discrete members which are soldered together, irrespective of whether such members are of conventionally solderable material.

2. Prior Art

Mosaics structures embodied in this invention have been heretofore difficult, if not impossible, to construct with soldered joints because the materials are inherently unsolderable. The problem of soldering conventionally unsolderable surfaces has also been characterized as the difficulty of creating a tinnable surface, that is, a surface to which solder will adhere. Various approaches to this problem are demonstrated in three areas: the formation of circuit boards, the splicing of fiber optical rods and decorative stained glass construction.

With regard to printed circuit boards, a method is known which comprises printing a curable adhesive ink in a predetermined pattern on an insulating base, applying metal powder onto the printed insulating base whereby discrete particles of the metal powder are retained on the printed adhesive ink only, and curing the adhesive ink so as to fix the discrete particles of metal powder thereon. The remaining steps involve immersing the insulating base in an aqueous solution of stannous chloride and palladium chloride for producing an activating agent thereon, and subsequently treating the base with an electroless metal deposition bath. In another method, a printed circuit board is constructed by applying an adhesive to the surface of an organic resin plate in an electrical circuit pattern, scattering metal powders on the adhesive, pressing the scattered metal powders, so that the metal powders are partly imbedded in and partly exposed to the surface of the adhesive, curing the adhesive combined with the metal powders and depositing a conductive metal coating on the exposed metal powders by electroless plating whereby the exposed metal powders act as a catalyzer. Both of these methods require the step of electroless plating prior to soldering, whereas the subject invention requires no such step. Further, although it is noted that the resultant electrical circuit path is strong enough to stand up to soldering, there is no indication that such a bond would be strong enough to hold structural members together.

With regard to splicing fiber optical rods, it is known to coat the peripheral surface of the glass members to be joined with a thin adhering metallic layer. The coated glass members are properly positioned adjacent one another and solder is flowed around the joint between the members. While such a joint is strong enough to maintain the fiber optical rods in an aligned orientation, there is no teaching that such a joint would or could be strong enough for joining structural members. In particular, the metallic layer is formed from a glass adhering paste designated "Bright Platinum, 0.5X, Paste". Such a metallic paste is very, very expensive, and therefore wholly unsuitable for a large scale application. The method of this invention, which provides a joint strong enough to join structural members, may be practiced with nearly any high temperature resistant adhesive and relatively inexpensive solderable metallic strips, or particles such as copper.

In the area of decorative stained glass, a tinnable surface is provided by edging each piece of glass with a thin strip of metal foil, which is soldered into a continuous metal perimeter. The respective foiled edges are then soldered together. Such a joint is significantly weaker than that formed by the method taught in this invention, and is much more costly and time consuming. Further, a metal foil joint must be caulked in order to weatherproof or waterproof the joint, whereas a joint made in accordance with this invention is inherently weatherproof and waterproof.

All of the disadvantages of the prior art methods for soldering to conventionally unsolderable surfaces are overcome by the methods taught in my copending application Ser. No. 957,028, now U.S. Pat. No. 4,172,547, and my copending application Ser. No. 22,652, whereby any conventionally unsolderable surfaces may be joined by: (1) coating the surfaces with an adhesive; while the adhesive is still tacky, (2) coating the adhesive layers with solderable metallic particles, in accordance with the teachings of application Ser. No. 957,028, or (2) seating a metallic strip in the adhesive in accordance with the teachings of application Ser. No. 22,652; and, after the adhesive is cured, (3) soldering the surfaces together, the solder adhering to the metallic particles or metallic strips and forming a bond between the surfaces. The adhesive is preferably a high temperature resistant adhesive. The solderable metallic particles are a combination of granules and powder, preferably copper. The solderable metallic strips may be flat, or may have loops or hooks punched or otherwise pushed therethrough, preferably projecting from both surfaces of each strip, and are also preferably copper. By the methods of these inventions, it is possible to solder to virtually any conventionally unsolderable surface, including glass, porcelain, plastics, wood, unsolderable metals such as steel and paper products. The methods are also effective for joining a solderable surface or material to a conventionally unsolderable surface or material.

The mosaic structures contamplated by this invention include not only "traditional" stained glass structures, but all manner of wood mosaics which might be incorporated into articles of furniture, such as table tops, veneers and lampshades and all manner of hybrid structures, such as wood-glass as well. This invention further comtemplates a mosaic structure, either flat or multi-dimensional, which comprises at least one conventionally unsolderable member of any material.

SUMMARY OF THE INVENTION

It is an object of this invention to provide novel mosaic structures.

It is another object of this invention to provide novel mosaic structures having soldered joints.

It is still another object of this invention to provide novel mosaic structures having joints which are inherently weatherproof and waterproof.

It is still further object of this invention to provide novel mosaic structures which are flat or multi-dimensional.

It is yet another object of this invention to provide novel mosaic structures which are substantially self-supporting.

These and other objects are accomplished by providing mosaic structures having soldered joints, but comprising one or more members formed from a conventionally unsolderable material. Two methods for constructing the mosaic structures comprise the steps of applying adhesive to the edges of members to be joined, coating the adhesive with solderable metallic particles or seating a solderable metallic strip in the adhesive while the adhesive is still tacky, and, after the adhesive is cured, soldering the edges together, thereby joining the pieces of glass into a substantially self-supporting structure. The adhesive is preferably a high-temperature resistant adhesive, preferably of silicone base. The solderable metallic particles are preferably a combination of granules and powder, preferably of copper. The metallic strips may be provided with hooked or looped projections, and are also preferably copper. These methods are fully described in my copending applications Ser. No. 957,028, now U.S. Pat. No. 4,172,547, Ser. No. 957,029 and Ser. No. 22,652. The bead of solder which joins each edge of the mosaic structure provides a completely weatherproof and waterproof seal, requiring no additional putty or caulking.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
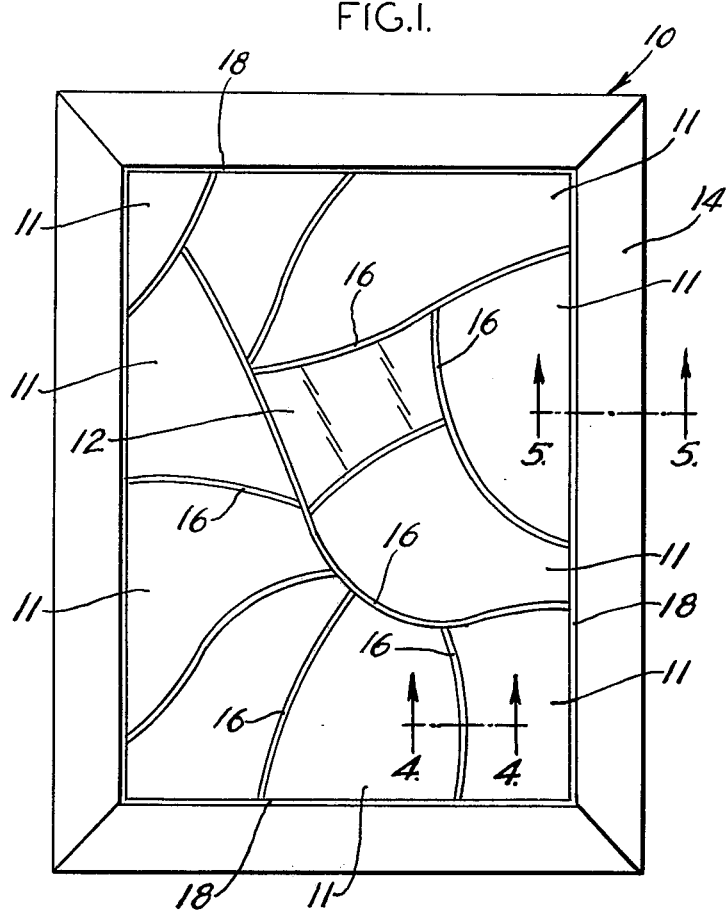
FIG. 1 is a mosaic structure in the form of a tabletop, comprising wood and stained glass members in accordance with this invention.

A representative mosaic structure 10 in the form of a tabletop and constructed in accordance with the methods of my aforementioned copending applications is shown in FIG. 1. A plurality of wood members 11, and one stained glass member 12, are joined to one another by a plurality of joints 16, and are joined to frame 14 by a plurality of joints 18. The frame 14 is shown as wood, but may be another material, such as metal.

Figure 2:
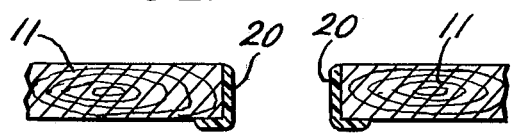
FIGS. 2, 3 and 4 sequentially illustrate one method for joining members of a mosaic structure according to this invention, FIG. 4 also being a section view taken along the line 4—4 in FIG. 1.

One method for constructing joints 16 is taught in my copending applications Ser. No. 957,028, now U.S. Pat. No. 4,172,547 and Ser. No. 957,029, the teachings of which are fully incorporated herein by reference. The method is sequentially shown herein by FIGS. 2, 3 and 4. Briefly, the first step, illustrated in FIG. 2, is the application of an adhesive layer 20 to each edge of a member which is to be joined. The glue or adhesive 20 should be a high-temperature resistant adhesive, in order to withstand the normal operating temperatures of a typical soldering iron or soldering gun. Two suitable adhesives include silicon base adhesive, such as Dow Corning 734 RTV Selastic and firebrick cement, generally comprising firebrick clay and asbestos fiber, such as Pecora Firebrick Cement. The adhesive or glue 20 preferably covers or substantially covers all of the mutual edges to be joined. The adhesive 20 may be applied with a foam covered roller or with a brush, the bristles of which have been cut and notched according to the thickness of the member to be joined.

Figure 3:
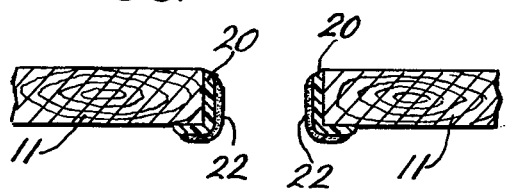

The second step, illustrated in FIG. 3, must be performed while the adhesive or glue 20 is still tacky, that is, before it has cured. In the second step, a coating of metallic solderable particles 22 is applied to the adhesive layers 20. Suitable solderable metallic particles include such metals as copper, silver and gold. In size, the particles are preferably a combination of granules and powder, although either alone is still effective. A suitable solderable metallic particle is Alcan metal powder MD No. 41, which is copper. The metallic particles 22 may be applied by sprinkling them over the adhesive layers, or the adhesive layers may be dipped or pressed into trays containing the metallic particles. In either event, a substantially uniform coating is desirable, although not absolutely necessary.

Figure 4:
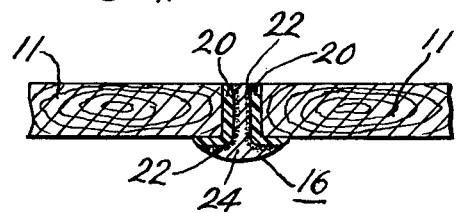

The third and final step, illustrated in FIG. 4, takes place after the adhesive has cured, thereby bonding the metallic particles to the pieces of glass. The edges to be joined are placed in abutting relationship, and soldered together using standard solder, such as a lead-tin composition, and standard soldering irons or soldering guns. The result is a neat solder bead 24 which completely seals the joint 16. This joint is weatherproof and waterproof.

Figure 5:
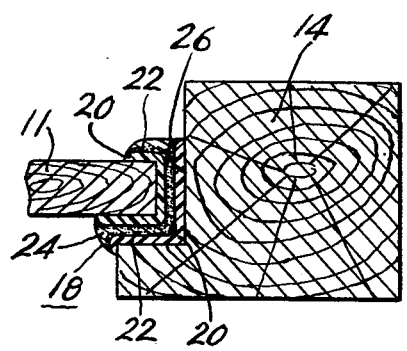
FIG. 5 is a section view taken along the line 5—5 in FIG. 1.

For substantially flat mosaic structures, such as the tabletop illustrated in FIG. 1, it may be desirable to have a substantially flush joint, as typified by the upper part of joint 16 as shown in FIGS. 3-5. Where the joint is not visible, or where a traditional "stained glass look" is desired, one or more surfaces of the joint may be built up, as typified by the lower part of joint 16. This built up construction also provides additional strength.

As an alternative to the foregoing method, the mosaic structures may also be constructed by the method taught in my copending application Ser. No. 22,652, the teachings of which are fully incorporated by reference. Briefly, in this method, solderable metallic strips are used instead of the solderable metallic particles. The strips may be flat, or may have hooked or looped projections. The strips are seated in the adhesive layers while the adhesive is still tacky. When the projections are stamped or punched out of the strips, the adhesive can flow through the resulting openings, providing additional strength. Otherwise, the methods are substantially similar. Either method is also suitable for joining wood members 11 to glass member 12, as well as any other conventionally unsolderable material, including but not limited to porcelain, plastics, unsolderable metals such as steel and paper products.

The method described herein is also suitable for joining wood members 11 and glass member 12 to frame 14, illustrated as wood. As shown in FIG. 5, an adhesive layer 20 is applied to the edge of member 11 and the mounting lip or notch 26 of frame 14. While these adhesive layers 20 are still tacky, a coating of solderable metallic particles 22 is applied to each, in the manner described hereinbefore. After the adhesive has cured, the perimeter members and wood frame may be soldered directly together, forming joint 18. Joint 18 is as waterproof and weatherproof as joint 16. This method would also be effective with a metal frame.

Figure 6:
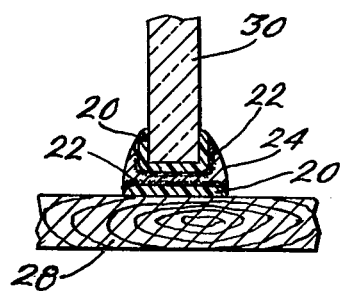
FIG. 6 illustrates a rightangle bond between a wood member and a glass member, as might be found in a multi-dimensional mosaic structure in accordance with this invention; and, FIG. 7 is a perspective view of a lampshade in accordance with this invention.

The method described herein is also effective for joining members of a mosaic structure in any multi-dimensional desired orientation, as well as in edge to edge relationship. Illustrated in FIG. 6 are pieces of wood 28 and glass 30, disposed at right angles to one another. If such a joint were to be made by a traditional decorative stained glass method, such as the lead came or copper foil methods, it would be necessary to encircle each piece of glass with a continuous metal perimeter. The perimeters would then be soldered together, and it would still be necessary to caulk the joint. It would probably also be necessary to buttress the joint, if one of the pieces of glass projected outward, instead of possibly being balanced in an upright position as shown in FIG. 6. However, in a multi-dimensional mosaic constructed by the methods of this invention, it is necessary to apply adhesive only to those surfaces or edges which will actually be joined. Continuous metal perimeters are completely unnecessary. As illustrated, one first applies layers of adhesive 20 and coatings of metallic particles 22. After the adhesive is cured, the members to be joined are soldered together by solder bead 24. This joint is strong enough to support an outthrusting member, of reasonable weight, without additional support.

Mosaic structures in accordance with this invention particularly lend themselves to being repaired. In particular, it is very easy to replace any particular member which may have become broken, stained or scratched by desoldering the necessary joints and replacing the member with another new piece, the edges of which have been prepared accordingly. Such a member may be easily soldered into place. The repaired joint will be as strong, weatherproof and waterproof as the original joint.

Figure 7:
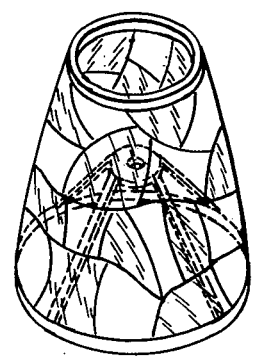

Mosaic structures according to this invention include many decorative and practical structures, such as tabletops, veneers, tiffany-style lampshades, (shown in FIG. 7), screens, and other articles of furniture, as well as sculptures in general.

The present invention may be embodied in other specific forms without departing from the spirit or essential attributes thereof, and accordingly, reference should be made to the appended claims, rather than to the foregoing specification as indicating the scope of the invention.

I claim:

1. A substantially self-supporting structure comprising a number of constituent wood members, said members being joined to one another by solder joints, each of said joints comprising a layer of adhesive bonded to each joined surface of said wood members, a metallic layer of solderable particles bonded to each said adhesive layer solderable particles, and a bead of solder bonding each said metallic layer to a corresponding metallic layer.

2. The structure of claim 1, wherein said members are substantially flat.

3. The structure of claim 1, wherein said members are disposed in a multi-dimensional form.

4. The structure of claim 1, wherein the solder joints are formed substantially flush with at least one surface of said structure.

5. The structure of claim 1, wherein said particles are a combination of granules and powder.

6. The structure of claim 1, wherein said adhesive is a high temperature resistant adhesive.

7. The structure of claim 1, wherein the adhesive substantially covers each soldered edge, as well as a narrow strip on at least one surface bordering each said soldered edge.

8. The structure of claim 1, wherein said metallic particles are copper.

9. The structure of claim 1, wherein said structure is in the form of a mosaic tabletop.

10. The structure of claim 1, wherein said structure is in the form of a lampshade.

* * * * *

UNITED STATES PATENT AND TRADEMARK OFFICE
CERTIFICATE OF CORRECTION

PATENT NO. : 4,255,475
DATED : March 10, 1981
INVENTOR(S) : Donald Delgrande

It is certified that error appears in the above—identified patent and that said Letters Patent are hereby corrected as shown below:

At column 6, line 17 (Claim 1, line 7), after "layer" insert --of--.

Signed and Sealed this

Twenty-first Day of July 1981

[SEAL]

Attest:

Attesting Officer

GERALD J. MOSSINGHOFF

Commissioner of Patents and Trademarks